Sept. 20, 1966      G. W. SEIFERT      3,273,681

THERMOSTATIC TORQUE RESPONSIVE CLUTCH

Filed Jan. 13, 1965      4 Sheets-Sheet 1

INVENTOR.
GERD WOLFGANG SEIFERT

BY Karl G. Ross

AGENT

Sept. 20, 1966  G. W. SEIFERT  3,273,681
THERMOSTATIC TORQUE RESPONSIVE CLUTCH
Filed Jan. 13, 1965  4 Sheets-Sheet 2

INVENTOR:
GERD WOLFGANG SEIFERT
BY
Karl G. Ross
AGENT

INVENTOR,
GERD WOLFGANG SEIFERT
BY
Karl F. Ross
AGENT

United States Patent Office 3,273,681
Patented Sept. 20, 1966

3,273,681
THERMOSTATIC TORQUE RESPONSIVE CLUTCH
Gerd Wolfgang Seifert, Seestrasse 190,
Unterschondorf, Germany
Filed Jan. 13, 1965, Ser. No. 425,146
Claims priority, application Germany, Jan. 15, 1964,
S 89,070; Apr. 18, 1964, S 90,623
10 Claims. (Cl. 192—54)

This application is a continuation-in-part of my application Ser. No. 288,356 filed 17 June 1963, now Patent No. 3,209,993.

My present invention relates to a self-tightening clutch assembly of the character described in my above-entitled application in which two co-operating clutch members, originally disengaged, are brought into rapid interengagement with the aid of a pair of co-operating camming formations (e.g. mating threads of large pitch angle) upon incipient and rotary entrainment of one clutch member by the other.

Clutch assemblies of this type may be used, for example, in conjunction with internal-combustion engines of automotive vehicles for the purpose of intermittently driving a radiator fan under the control of a thermostat responsive to the temperature of a cooling fluid traversing the radiator, as likewise disclosed in my above-identified prior application.

The self-tightening action of such clutch assemblies upon incipient contact is highly advantageous in that it facilitates the coupling or uncoupling of a driving element and a driven element in response to minor deformations of, say, temperature-sensitive control means such as a bimetallic strip or membrane. In practice, however, it is not always desirable to have abrupt changeovers from a disengaged to an engaged position, or vice versa, as has heretofore been the case in a system of this type.

It is, therefore, an object of my present invention to provide an improved clutch assembly of this character wherein the torque transmitted from the driving to the driven member varies more gradually between zero and a maximum value, in the event of a switchover, and wherein this torque may even remain at some intermediate value in the engaged position of the clutch.

More particularly, since in a system of this description the clutch is tightened when the driving member overtakes the driven member and is released when the rotation of the driving member tends to lag behind that of the driven member, my present invention aims at providing means in such system for preventing frequent opening and closing of the clutch in a situation in which the speed of the driving member is not constant, as is generally the case in an automotive engine, by letting the clutch develop just enough torque to bring the driven member to substantially the speed of the driving member so that the former will not tend to overrun the latter except upon a major deceleration of the driving member.

It is also an object of this invention to provide means in such an assembly for automatically locking the clutch members in their engaged position, independently of any tendency of the driven member to lead or lag with reference to the driving member, whereby the driven member can be entrained at any speed and even in the opposite direction upon an initial interengagement of the two members.

According to an important feature of my invention, an axially cammable coupling element carried by the driving member of a clutch assembly with freedom of limited relative rotation, such as a nut with coarse female threads riding on a complementarily threaded male element constituted by a drive shaft, is connected or connectable via an axially yieldable resilient linkage with a rotary body forming a first annular contact surface adjacent a second annular contact surface on a co-operating driven member, the two contact surfaces being normally spaced apart in axial direction of the shaft but being brought into frictional engagement upon relative rotation of the male and female elements in a sense causing the coupling element to approach the driven member. Upon such approach, which may be initiated by incipient contact between the two surfaces whereby the coupling element rotates relatively to the driving member or shaft, the resilient linkage is stressed to an extent commensurate with the advance of the coupling element toward the driven member; the torque transmitted from the driving member to the driven member will be a function of the contact pressure developed between the rotary body and the driven member, this contact pressure depending in turn upon the stress of the resilient linkage and being therefore determined by the extent of the approach. If but a slight torque is needed to bring the driven member up to the speed of the driving member, the coupling element will travel only a little distance toward the driven member in order to create the stress necessary for the transmission of this torque; if the drag of the driven member is large, the coupling element may have to travel the full extent of its axial stroke in order to generate enough friction for the transmission of the requisite torque. In either case, however, the resiliency of the linkage between the coupling element and the rotary body (e.g. a ring concentrically surrounding the aforementioned nut) will insure the continued engagement of the two contact surfaces in the event of a limited deceleration of the driving member relative to the driven member, the resulting retreat of the coupling element being merely sufficient to reduce the transmitted torque to a value suitable for entrainment of the driven member at the decreased speed.

The connection between the coupling element and the associated annular contact body need not be permanent but may come into effect only upon a travel of the coupling element from its normal position, e.g. through interengagement of normally disengaged gear teeth or equivalent transmission means.

According to another feature of my invention, an advance of the coupling element to the full extent of its stroke is utilized to actuate a detent mechanism which effectively latches the driven member to the driving member, in a position of maximum torque transmission, so that these members will rotate jointly at any speed and in either direction until a major restoring force retracts the coupling element sufficiently to release the detent mechanism.

The invention will be described in greater detail with reference to the accompanying drawing in which.

Figure 1:
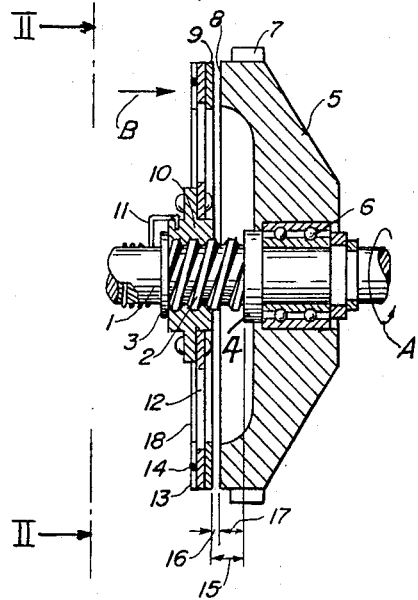
FIG. 1 is a cross-sectional view, in axial direction, of a self-tightening clutch assembly embodying my invention.
Figure 2:
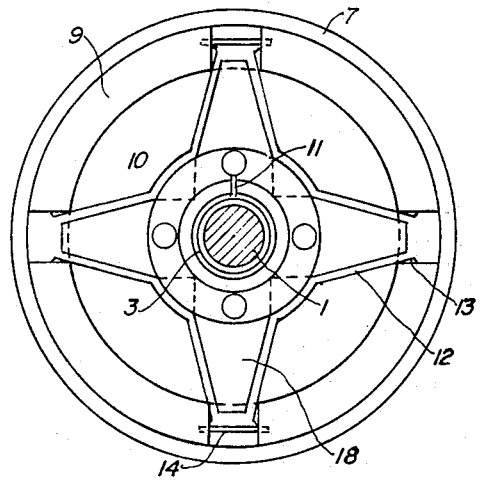
FIG. 2 is a face view of the assembly taken on the line II—II thereof.

The clutch assembly shown in FIGS. 1 and 2 comprises a drive shaft 1 provided with male threads 2 mating with complementary female threads of a nut 10, the pitch angle of these threads being large enough to enable displacement of the nut 10 along shaft 1 in response to an axial force. Shaft 1 is formed with a pair of shoulders 3, 4 whose separation substantially exceeds the width of the nut 10, the difference having been indicated at 15. Nut 10 is normally held against stop 3 by a retaining spring 11.

A driven member 5, supported on shaft 1 by ball bearings 6, carries peripheral gear teeth 7 coupled with a load (not shown), e.g. the fan of an automotive cooling unit associated with an internal-combustion engine which drives the shaft 1 as indicated by an arrow A. A frictional contact surface 8 on member 5 confronts a similar contact surface on an annular body 9 which is mounted concentrically with nut 10 through the intermediary of a resilient linkage represented by a spider-shaped spring 12, the arms of this spring being received in recesses 13 of ring 9 to which they are secured by fastening means 14. Each of these spring arms is shown reinforced by a resilient leaf 18.

The gap normally existing between surface 8 and ring 9 has been indicated at 16 and is considerably narrower than the stroke 15 of the nut 10 along the threaded portion 2 of shaft 1. The distance 17, i.e. the difference between separations 15 and 16, thus represents the effective range within which ring 9 is pressed against surface 8 with greater or less force depending upon the extent of the advance of nut 10 toward its alternate stop 4. Even when the nut contacts this stop, only a part of the torque of shaft 1 will be transmitted to driven member 5 by its frictional contact with ring 9 as determined by the stiffness of spring 12.

In operation, a slight displacement of nut 10 and/or ring 9 toward member 5, thus toward the right as viewed in FIG. 1 and as indicated by an arrow B, will suffice to close the gap 16 and to bring about incipient contact between this member and ring 9. This contact results in entrainment, in the direction of arrow A, of driven member 5 which initially will rotate at slow speed and will therefore exert upon ring 9 a retarding force causing relative rotation between nut 10 and shaft 1. The direction of this relative rotation is such that threads 2 will cam the nut 10 axially toward the stop 4 whereby, as a result of the deflection of the arms of spring 12, the friction between ring 9 and contact surface 8 is increased so that the driven member 5 is further accelerated. When the speed of this member equals that of shaft 1, no relative motion occurs between the shaft and nut 10 so that the advance of the nut toward the right in FIG. 1 is halted; in fact, if the momentum of member 5 is now sufficient to maintain its speed with reduced transmission of torque, nut 10 may be somewhat retracted by its restoring spring 11 to a position just sufficient to maintain the necessary friction between ring 9 and surface 8. If, thereafter, the speed of shaft 1 and/or the drag of member 5 undergo minor variations, limited slippage will occur between members 1 and 5 (but not between surface 8 and ring 9) until the nut 10 has found its new axial position of equilibrium. The clutch will be released only when the load-connected driven member 5 overruns the shaft 1 to such an extent (e.g. upon sudden throttling of the driving engine) that nut 10 returns to its position in contact with stop 3, thereby re-establishing the gap 16.

The initial clutch-engaging force, symbolized by arrow B, may be that of any suitable controller, e.g. a thermostatic device as disclosed in my prior application and described hereinafter with reference to FIGS. 7–9, or may be applied manually, as will be described with reference to FIG. 3. Such a force could be exerted upon the ring 13 either directly or through the intermediary of nut 10 and spring 12; also, incipient contact between surface 8 and ring 9 could be brought about by an initial rotation of the ring relative to shaft 1, e.g. by the application of an external braking force to the ring.

In FIGS. 3, 4, 5 and 6, suffixes $a$, $b$, $c$ and $d$ have been respectively used to indicate elements already described.

Figure 3:
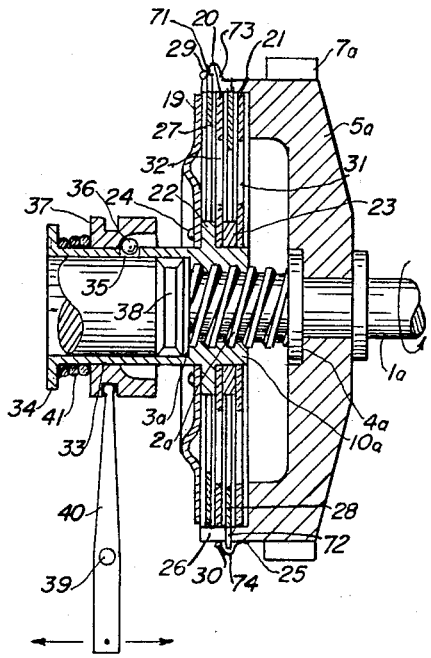
FIG. 3 is a view similar to FIG. 1, illustrating a modification.

The system of FIG. 3 includes a set of resilient radial disks 19, 20 and 21 mounted on the nut 10$a$, the peripheral zones of these disks forming frictional contact surfaces whereas the webs of the disks constitute resilient linkages equivalent to the spring 12, 18 of FIGS. 1 and 2. These webs may have radial cutouts for increased resiliency and improved alignment, as illustrated at 31 and 32 for disks 21 and 20 respectively. A peripheral flange 22 on nut 10$a$, interposed between disks 19 and 20, and a spacing ring 23, inserted between disks 20 and 21, serve to maintain the necessary axial separation between these disks. Bolts 24 traverse the elements 19, 23 in order to connect the disks positively with the nut 10$a$.

The peripheral zones of disks 19, 20 and 21, rotatable together with nut 10$a$ and shaft 1$a$, alternate with intervening concentric rings 27 and 28 forming co-operating contact surfaces therefor, the rings and the disks being normally spaced apart by a slight clearance. Rings 27 and 28 are centered with reference to shaft 1 by an annular flange 25 of driven member 5$a$, this flange having slots 26 to receive radial projections of rings 27 and 28 for their guidance. Some of these radial projections, indicated at 71 for the ring 27 and at 72 for the ring 28, extend beyond the flange 25 for engagement with external stops 29 and 30, respectively, against which these projections are normally urged by respective leaf springs 73, 74. When the nut 10$a$ advances from its normal position adjacent stop 3$a$ toward the stop 4$a$ by a camming action of threads 2$a$ as previously described, the gaps originally existing between disks 19–21 and rings 27, 28 disappear and torque is transmitted from shaft 1$a$ to driven member 5$a$ in the same manner as in the preceding embodiment. Means for bringing about an initial displacement of the nut 10$a$, in order to start the transmission of torque, have been illustrated in FIG. 3 in the form of a manually or otherwise operable lever 40, with a fixed fulcrum 39, engaging in an annular groove of a sleeve 37 surrounding an extension 33 of nut 10$a$ which terminates in a flange 34 and which also has a port 35 occupied by an outwardly projecting spherical indexing element 36. The ball 36, whose inward displacement is normally prevented by a portion of shaft 1$a$ received in the tubular extension 33, bears upon an internal shoulder of sleeve 37 to prevent its displacement relative to the nut 10$a$ under the action of a compression spring 41 interposed between sleeve 37 and flange 34. Shaft 1$a$, however, also has an annular groove 38 into which the ball 36 may drop whenever the nut 10$a$ advances toward stop 4$a$ to the full extent of its stroke, the sleeve 37 being then urged by the spring 41 into a position confining the ball 36 in the groove 38 so that nut 10$a$ is locked against axial shifting relative to shaft 1$a$ and therefore can also no longer rotate with reference thereto. In this locking position, therefore, the detent sleeve 37 prevents a withdrawal of nut 10$a$ and maintains the clutch faces of elements 19–21, 27, 28 in continuous engagement at maximum contact pressure, the driving member 1$a$ and the driven member 5$a$ being thus effectively latched together for joint rotation in either direction and at any speed within the limits of torque transmissivity afforded by the clutch.

The system illustrated in FIG. 3 will thus operate with variable torque transmission once the gaps between the clutch faces have been closed by a slight initial displacement of lever 40 as long as the relative drag of member 5$a$ is not sufficient to let the nut 10$a$ advance into its other limiting position (adjacent stop 4$a$) in which port 35 registers with groove 38. When this occurs either as a result of a substantial lag of member 5$a$ relative to shaft 1$a$ or in response to a full displacement of control lever 40, the clutch will remain locked until the previous situation is restored by a reversal of lever 40. This reversal, if followed by a leftward displacement of nut 10$a$ (due to overrunning of member 5a) sufficient to lift the ball 36 out of the cam-shaped groove 38, restores the condition of variable torque transmission whereupon disengagement will again occur when the shaft 1a is reversed or sharply decelerated, i.e. when the member 5a coupled with the load overruns the shaft 1a (in the forward direction of rotation) to a predetermined extent.

Figure 4:
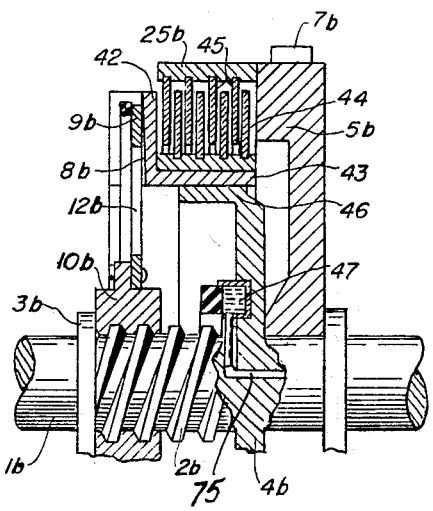
FIGS. 4, 5 and 6 are sectional views each similar to part of FIG. 1, representing three further embodiments.

The system of FIG. 4 comprises an annular carrier 42, 43 of L-shaped cross-section, rigid with ring 9b, which supports a set of radially outwardly extending contact rings 44 concentric with shaft 1b. Interspersed with rings 44 are similar rings 45 extending radially inwardly from a flange 25b on driven member 5b. Spring 12b, supporting ring 9b on nut 10b, may be generally similar to spring 12 of FIGS. 1 and 2. Carrier flange 43 is peripherally guided on an inner flange 46, rigid with shaft 1b as an extension of its shoulder 4b, an annular fluid cushion 47 being interposed between this shoulder and nut 10b to soften the impact therebetween. A fluid-supply channel 75 extends from the interior of cushion 47 along the axis of shaft 1b to a suitable high-pressure reservoir, not shown; the flow resistance of passage 75 may be sufficiently elevated to give the cushion 47 the characteristic of a dash pot. Carrier portion 42 acts as a backstop for the contact rings 44, 45 which may consist of thin foil and, of course, could be much more numerous than has been illustrated.

Figure 5:
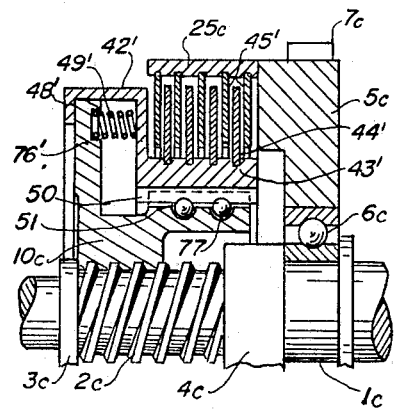

In FIG. 5 I have shown the nut 10c formed with a flange 76' bracketed by an annular carrier 42', 43', a set of coil springs 49' (only one illustrated) being interposed as a resilient linkage between this carrier and flange 76'. Carrier flange 43' and nut 10c are formed with interengaging peripheral teeth 50, 51 enabling their free relative axial displacement while maintaining them angularly aligned, the teeth 50 of element 43' being further shown supported by ball bearings 77 to reduce the friction between these bodies. Interleaved inner and outer contact rings 44' and 45' are again supported on concentric annular elements 43' and 25c, the latter being rigid with driven member 5c. The relative axial displacement of nut 10c and carrier 42', 43' is limited by a flange 48' of that carrier serving as a back stop for flange 76'.

Figure 6:
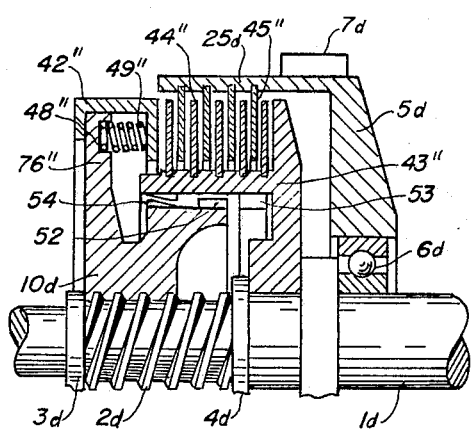

In FIG. 6 I have shown a similar system wherein elements designated by primed numerals in FIG. 5 have been indicated by like numerals with double primes. Here, however, the carrier portion 43'' supporting the inner contact rings 44'' has been separated from the part 42'' which bears the flange 48'' and embraces the flange 76'' of nut 10d together with coupling springs 49''. Axially fixed element 43'', rotatable with reference to its shaft 1d, has peripheral teeth or ridges 53 adapted to mesh with complementary teeth 52 on nut 10d upon an initial displacement of this nut toward the right, i.e. toward the member 5d; in the withdrawn position of nut 10d there exists thus no positive connection between carrier 43'' and nut 10d so that a clutching operation could not be initiated by a deceleration of this carrier, e.g. through contact between the rings 44'' and 45''. In this case, therefore, the starting force will have to act directly (axially or peripherally) upon nut 10d to cause its advance toward stop 4d. Normally disengaged synchronizing means 54, of the type known as "Synchromesh," are provided on nut 10d and carrier 42'' to prevent a clashing of gear teeth 52, 53 upon such displacement of the nut. For a description of "Synchromesh" transmissions, reference is made to Technical Manual TM 9–8000, U.S. Army Department, January 1956, pages 284 ff.

Naturally, the systems of FIGS. 4–6 could also be provided with restoring means such as the spring 11 of FIGS. 1 and 2. Moreover, either or both sets of co-operating friction rings 44, 44', 44'' or 45, 45', 45'' could be mounted for independent axial displacement against a resilient retaining force, e.g. as illustrated in FIG. 3 for the rings 27 and 28.

Figure 7:
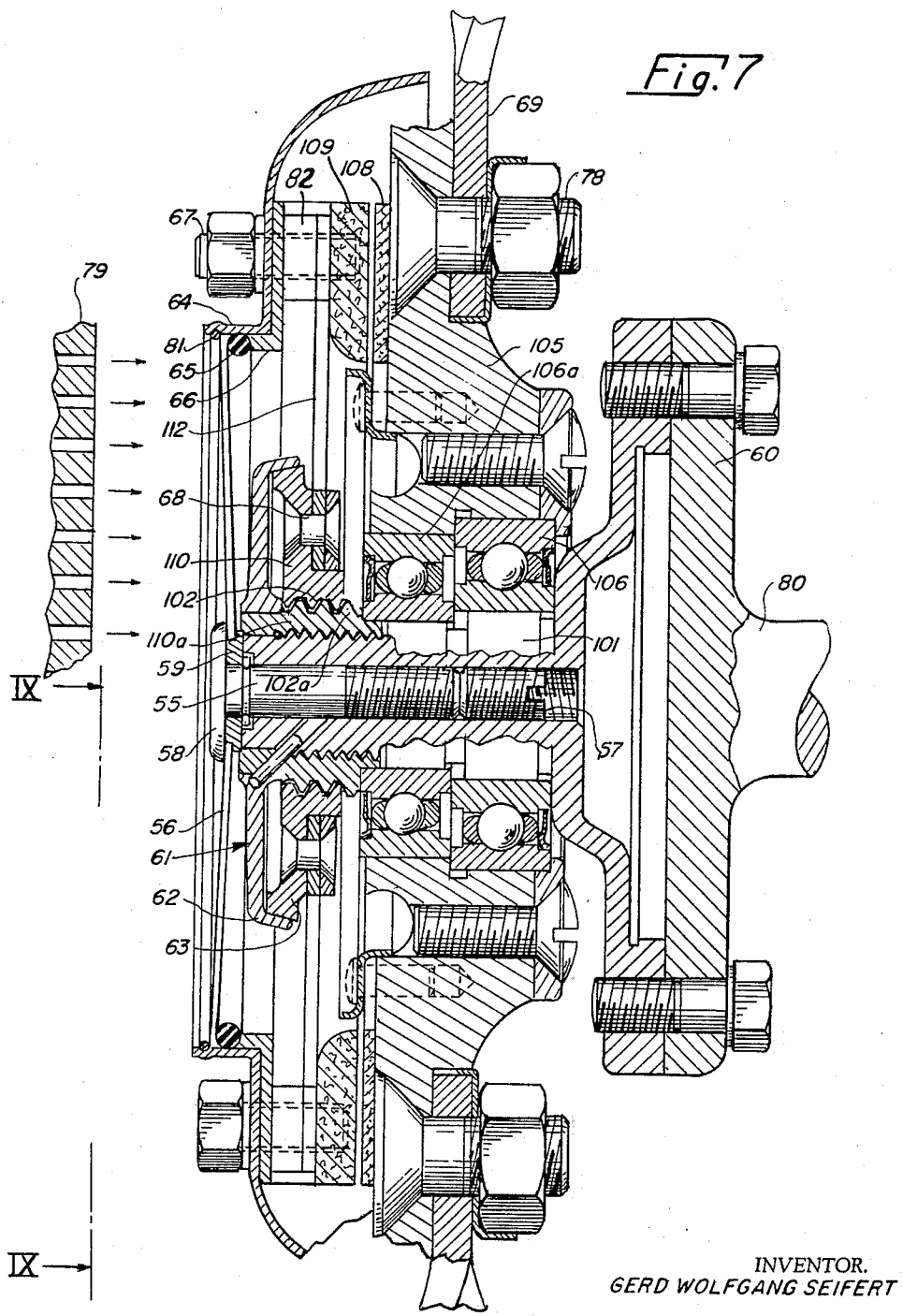
FIG. 7 is another view in axial section, illustrating a system of the type shown in FIGS. 4 and 5 of my above-identified prior application but with the present improvement incorporated therein.
Figure 8:
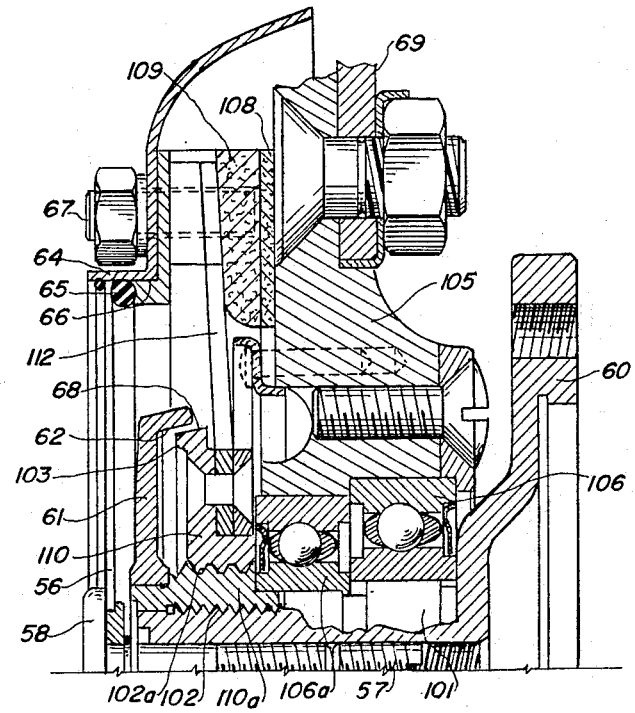
FIG. 8 is a view similar to the upper part of FIG. 7, showing the system thereof in an alternative position.
Figure 9:
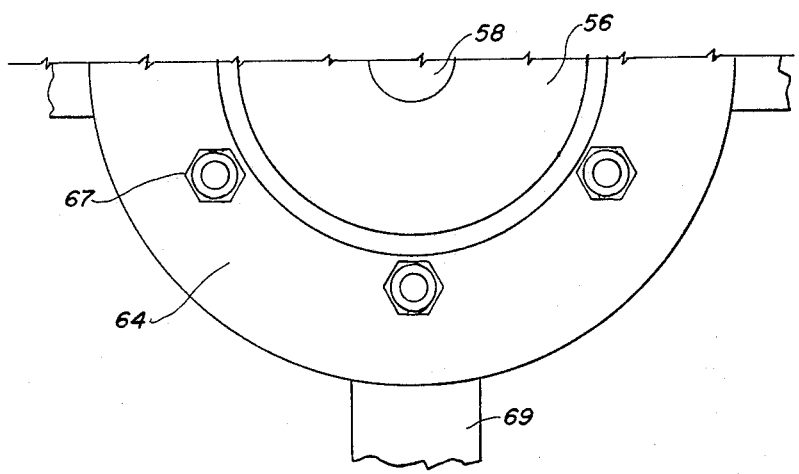
FIG. 9 is a partial face view of the assembly shown in FIGS. 7 and 8, taken on the line IX—IX of FIG. 7.

In FIGS. 7–9 I have shown a clutch assembly of the same general character, used to drive a set of propeller blades 69 forming part of a fan designed to cool the radiator 79 of an autometive engine having a shaft shown at 80. This engine shaft is rigidly connected with a flange 60 on a clutch shaft 101 having threads 102a by which it is connected with a bushing 110a bearing male threads 102 of large pitch angle. A nut 110 with complementary female threads rides the bushing 110a and is formed with a frustoconical flange 63 confronting a complementary guide flange 62 on a disk 61, rigid with a bushing 110a, which constitutes an abutment for nut 110. Shaft 101 has a partly threaded center bore traversed by a complementarily threaded screw 55 whose head 58 bears upon a flanged ring 59 to form a seat for a disk-shaped bimetalic membrane 56 of generally frustoconical, nonflattenanble configuration, this disk being instantly reversible in response to changes in ambient temperature to snap from the position of FIG. 7 into that of FIG. 8 or vice versa. A counterscrew 57 locks the screw 55 firmly in place.

The outer periphery of disk 56 rests against the inner periphery of a surrounding cowl 64 and is bracketed by a retaining ring 81 and by a bumper ring 65 resting against a stepped collar 66; a set of bolts 67 secure the elements 64, 66 to a friction ring 109 with interposition of washers 82 and of the outer ends of the arms of a spider-shaped supporting spring 112 which is riveted at 68 to the flange 63 of nut 110. Ring 109 confronts an annular friction layer 108 on an adjoining face of driven member 105 which is supported on shaft 101, with freedom of independent rotation, through the intermediary of ball bearings 106 and 106a. Member 105 has the fan blades 69 secured to it with the aid of screws 78.

In operation, the radiator 79 of the moving vehicle is traversed by a stream of air which impinges upon the thermosensitive control element 56 and whose temperature depends on that of a cooling fluid (generally water) circulating through the radiator. As long as this air stream is relatively cool, disk 56 occupies the position shown in FIG. 7 and friction rings 108, 109 are maintained disengaged; the coaction of flanges 62, 63 keeps the unit 110 centered and prevents any wobbling which could establish premature contact between these rings. When the temperature rises above a predetermined limit, disk 56 snaps into its alternate position (FIG. 8) and the two friction rings contact each other, thereby causing an axial displacement of nut 110 into its alternate limiting position (FIG. 8) or into some intermediate position along the coarse thread 102 of bushing 110a. It will be noted that, in this instance, the two races of ball bearing 106a serve as the second stop for the nut, there being no relative motion between these races when the nut has moved into contact with them. Fan 69 is now driven substantially at the speed of shaft 101, even if this speed is subject to variation, until the resulting cooling action has reduced the temperature of the oncoming air stream sufficiently to restore the disk 56 to the position of FIG. 7. Nut 110, however, reverts to its normal position only when the engine represented by shaft 80 is cut off or sharply throttled whereupon the ring 109 breaks contact with the ring 108 and the fan 69 comes to a stop.

Modifications of the specific constructions described and illustrated, including combinations and substitutions of compatible features from different disclosed embodiments, will be readily apparent to persons skilled in the art and are intended to be embraced within the spirit and scope of my invention except as otherwise limited by the appended claims.

I claim:

1. A clutch assembly for intermittently operating a cooling unit for an internal-combustion engine, comprising a drive shaft provided with male threads and powered by said engine; a nut on said shaft limitedly rotatable and axially displaceable with reference to said shaft, said nut having female threads mating with said male threads for axially displacing said nut from a normal position toward an off-normal position upon relative rotation of said nut and said shaft in a predetermined direction; a rotary body concentric with said shaft; force-transmitting means including an axially yieldable resilient linkage connecting said body with said nut at least in positions other than said normal position for joint rotation therewith; a driven member coaxial with said shaft and said body, said driven member being coupled with said cooling unit, said driven member and said body being provided with confronting annular contact surfaces spaced from each other in said normal position of said nut and bearing upon each other with increasing pressure upon progressive displacement of said nut toward said off-normal position for frictional entrainment of said driven member with a torque depending upon the axial position of said nut; and control means responsive to changes of ambient temperature in the vicinity of said engine for exerting upon said nut an axial force for shifting said nut into and out of said normal position with reference to said shaft, said threads having a pitch angle large enough to enable relative axial displacement of said nut and said shaft by said force.

2. A clutch assembly as defined in claim 1, futher comprising resilient restoring means tending to retain said nut in said normal position.

3. A clutch assembly as defined in claim 1 wherein said body and said driven member are each provided with a respective set of coaxial rings, the rings of said sets being interleaved and forming said contact surfaces.

4. A clutch assembly as defined in claim 1 wherein said shaft is provided with first and second abutment means engagable by said nut in said normal and off-normal positions, respectively.

5. A clutch asembly as defined in claim 1 wherein said resilient linkage includes at least one spring member extending generally radially outwardly from said nut.

6. A clutch assembly as defined in claim 5 wherein said spring member comprises a plurality of peripherally spaced radial arms.

7. A clutch assembly as defined in claim 1 wherein said resilient linkage comprises a spring member having a boss rigid with said nut and a plurality of peripherally spaced arms extending radially outwardly from said boss to said body, said nut being provided adjacent said boss with an outer frusto-conical peripheral surface, said shaft having rigidly mounted thereon an abutment engageable by said nut in said normal position thereof, said abutment being provided with a peripheral flange having an inner frustoconical peripheral surface matingly receiving said outer peripheral surface in said normal position for holding said nut centered on the axis of said shaft.

8. A clutch assembly as defined in claim 1 wherein said control means comprises a bimetallic disk-shaped membrane of reversible curvature mounted on said shaft and peripherally joined to said body.

9. A clutch assembly comprising a drive shaft provided with male threads; a nut on said shaft limitedly rotatable and axially displaceable with reference to said shaft; said nut having female threads mating with said male threads for axially displacing said nut from a normal limiting position toward an off-normal limiting position upon relative rotation of said nut and said shaft in a predetermined direction; a rotary body concentric with said shaft; force-transmitting means including an axially yieldable resilient linkage connecting said body with said nut at least in positions other than said normal position for joint rotation therewith; a driven member coaxial with said shaft and said body, said driven member and said body being provided with confronting annular contact surfaces spaced from each other in said normal position of said nut and bearing upon each other with increasing pressure upon progressive displacement of said nut toward said off-normal position for frictional entrainment of said driven member with a torque depending upon the axial position of said nut; and detent means for releasably holding said nut in one of said limiting positions, said shaft being provided with first and second abutment means engageable by said nut in said normal and off-normal positions, said first abutment means being a disk on said shaft provided with a guide flange for maintaining said nut centered in its normal position.

10. A clutch assembly for intermittently operating a cooling unit for an internal-combustion engine, comprising a rotatable driving member powered by said engine; a coupling element limitedly rotatable and axially displaceable with reference to said driving member, said element and said member being provided with co-operating threads for axially displacing said element from a normal position toward an off-normal position upon relative rotation of said element and said member in a predetermined direction; a rotary body concentric with said element; force-transmitting means including an axially yieldable resilient linkage connecting said body with said element at least in positions other than said normal position for joint rotation therewith; a driven member coaxial with said driving member and said body, said driven member being coupled with said cooling unit, said driven member and said body being provided with confronting annular contact surfaces spaced from each other in said normal position of said element and bearing upon each other with increasing pressure upon progressive displacement of said element toward said off-normal position for frictional entrainment of said driven member with a torque depending upon the axial position of said element; and control means responsive to changes of ambient temperature in the vicinity of said engine for exerting upon said element an axial force for shifting said element into and out of said normal position with reference to said driving member, said threads having a pitch angle large enough to enable relative axial displacement of said element and said driving member by said force.

References Cited by the Examiner

UNITED STATES PATENTS

| 1,882,805 | 10/1932 | Gillett | 192—54 X |
| 1,987,194 | 1/1935 | Kingston | 192—109 |
| 2,380,308 | 5/1945 | Harstick | 192—54 X |
| 2,381,567 | 8/1945 | Bonham. | |
| 2,950,796 | 8/1960 | Becker. | |
| 2,986,250 | 5/1961 | Becker. | |
| 3,118,292 | 1/1964 | Schroter et al. | 192—54 |
| 3,176,811 | 4/1965 | Smith | 192—54 |

FOREIGN PATENTS 914,255  10/1946  France.

DAVID J. WILLIAMOWSKY, *Primary Examiner.*
DON A. WAITE, B. W. WYCHE III,
*Assistant Examiners.*